Dec. 23, 1969     E. J. MICHNIEWICZ     3,485,558

SLIDE FEEDING AND HANDLING APPARATUS

Filed June 20, 1967     8 Sheets-Sheet 1

Inventor
Edward J. Michniewicz

Dec. 23, 1969   E. J. MICHNIEWICZ   3,485,558
SLIDE FEEDING AND HANDLING APPARATUS
Filed June 20, 1967   8 Sheets-Sheet 5

Inventor
Edward J. Michniewicz
By: Wallenstein, Spangenberg, Hattis & Strampel attys Dec. 23, 1969  E. J. MICHNIEWICZ  3,485,558
SLIDE FEEDING AND HANDLING APPARATUS
Filed June 20, 1967  8 Sheets-Sheet 8

Inventor
Edward J. Michniewicz
By Wallenstein Spangenberg
Hattis & Strampel
Attys.

United States Patent Office 3,485,558
Patented Dec. 23, 1969

3,485,558
SLIDE FEEDING AND HANDLING APPARATUS
Edward J. Michniewicz, Niles, Ill., assignor to Argus Incorporated, Chicago, Ill., a corporation of Delaware
Filed June 20, 1967, Ser. No. 647,425
Int. Cl. G03b 21/28
U.S. Cl. 353—104                    20 Claims

ABSTRACT OF THE DISCLOSURE

A slide projector having a slide stacking station, a slide receiving station, a slide track inclining downwardly and rearwardly to a point below the plane of the bottom of the stacking station, a slide projection station and a slide discharge station. The front portion of the stack of slides is supported by the front portion of the slide track and the rear portion of the stack of slides is supported by a ledge above the slide track. A reciprocally mounted slide feeding member pushes the bottommost slide in the stack forwardly off the ledge onto the track which extends in a direction at right angles to the direction of movement of the slides from the slide stack. The second slide in the stack is prevented from movement with the first slide by downwardly spring urged spherical balls. The slide feeding member is moved by a motor driven rotating member which also engages the slide feeding member and the slide transport member. The slide transport member moves slides from the slide receiving station to the projection station.

This invention has its principal application to apparatus for intermittently feeding slides, such as photographic transparency slides, from a stack thereof to a projection station. (By projection station is meant a station where indicia on a slide is transmitted by light rays or other means either directly to a viewer or upon a screen or other indicia receiving surface.) When slides are supported in a stack in face-to-face relation, difficulties are often encountered in moving only one slide at a time from the bottom of the stack. This problem becomes most severe when the slides in the stack are dirty, warped or are of widely varying thicknesses, as in the case of slides processed in foreign countries.

The present invention provides an apparatus for feeding slides, one at a time, from a stack of slides to a projection station even under the severe circumstances related above. In the most important application of the invention, separate slide feeding means are provided respectively for moving the slides from the first stack to a slide-receiving station next to the stack and then to a slide projection station, and a slide track extends between the slide-receiving and slide projection stations in a direction at right angles to the direction the slides are fed from the stack. The slide feeding means of the invention accomplishes this result without jamming of the slides even where the slides are warped or of varying thickness and with a very simple and economical construction.

It has, heretofore, been appreciated that the feeding of a first slide in a stack of slides without the movement of the next slide in the stack can be best accomplished by tilting the first slide in the stack with respect to the next slide and then moving the first slide in a direction parallel to the plane of the next slide so that there is only line contact between the slides. One of the features of the present invention utilizes this principle in a unique manner so that the slide feeding apparatus operates reliably with slides of widely different thickness or with warped slides. In the preferred form of the invention, it has been found most advantageous to orient the stack of slides so that the stack extends vertically with the rear end portion of the stack supported on a generally horizontally extending ledge and the front end portion of the stack supported upon the front portion of a rearwardly and downwardly inclining slide support surface constituting one end of said track in front of the ledge, the rear end of the slide support surface being offset from and below the ledge. A generally horizontally extending slide feeding member is provided having a slide engaging portion with a thickness no greater than the thinnest slide in the stack. The slide feeding member engages the rear edge of the bottom slide in the stack and pushes the same off the ledge where it can lie in face-to-face relation upon the rearwardly and downwardly inclining slide support surface. A slide abutment means is provided which confronts the front portion of the slide support surface so that the bottom slide in the stack which is moved beyond the ledge slides beneath the slide abutment means which resiliently urged toward the slide support surface. The slide abutment means acts as an abutment shoulder for the slide above the bottom slide to prevent the same from moving with the bottom slide to a point where it clears the ledge. The slide abutment means most advantageously comprises spherical balls which have a radius which is greater than the thickest slide in the stack of slides. The spherical balls preferably are mounted for movement away from the slide support surface in a direction inclining forwardly and upwardly with respect to a plane transverse to the slide support surface.

The slide track preferably comprises, in addition to the slide support surface referred to, a guide or abutment shoulder which extends transversely upwardly from the rear of the slide track. The guide shoulder guides the movement of the slides to the projection station in a manner to be described.

The slide feeding member is preferably resiliently urged by a spring into a rearward position, and is forced into a forward position where it pushes the bottom slide in the stack onto the slide support surface by a continuously rotating member which engages the slide feeding member during only a part of its revolution and moves the same forwardly against the restoring force of the spring.

The slide feeding member most advantageously has a depending portion which engages the front edge of a slide moved off of the ledge onto the slide support surface. Once the rotating member looses contact with the slide feeding member, the spring creates a rearward force which causes the depending portion of the slide feeding member to push to slide on the support surface against the guide shoulder. A slide transport member engages one end of the latter slide and moves the same along the guide shoulder and the depending portion of the slide feeding member to the slide projection station.

The slide transport member preferably comprises a reciprocating arm which is resiliently urged into an extreme position and is driven to a slide transporting position where a slide is pushed thereby to the projection station by the rotating member which engages the arm during a part of the revolution of the rotating member.

There is preferably provided at the projection station a resilient means which engages the front margin of the slide and urges the same in an inclined direction having a component extending toward the slide support surface of the slide track to flatten the slide involved and also a component in the direction of the guide shoulder, so that the slide is precisely positioned for projection at the slide projection station by the slide transport member. There is also preferably provided at the projection station a second resilient means which presses the rear end of the slide against the slide support surface to flatten the same.

A slide at the slide projection station is generally moved to a slide stacking chute constituting the aforementioned slide discharge station immediately beyond the slide projection station by the slide which is moved to the slide projection station. However, the last slide which is moved to the slide projection station must be moved to the stacking chute by other means. In accordance with the present invention, a slide sensing means is provided which, in the absence of the slide immediately in advance of the slide projection station, will direct a slide pushing member into the path of the last slide at the slide projection station so that the last slide will be pushed into the stacking chute after the last slide has been projected. The slide sensing means is positioned out of the path of a slide at the projection station when a slide is present on the slide track immediately beyond the slide projection station, so adjacent slides are moved from and to the projection station in edge to edge contact so there will be no distracting light streaks between adjacent slides where a photographic slide projector is involved.

The above and other features and advantages of the invention will become apparent upon making reference to the specification to follow, the claims and the drawings wherein:

Figure 1:
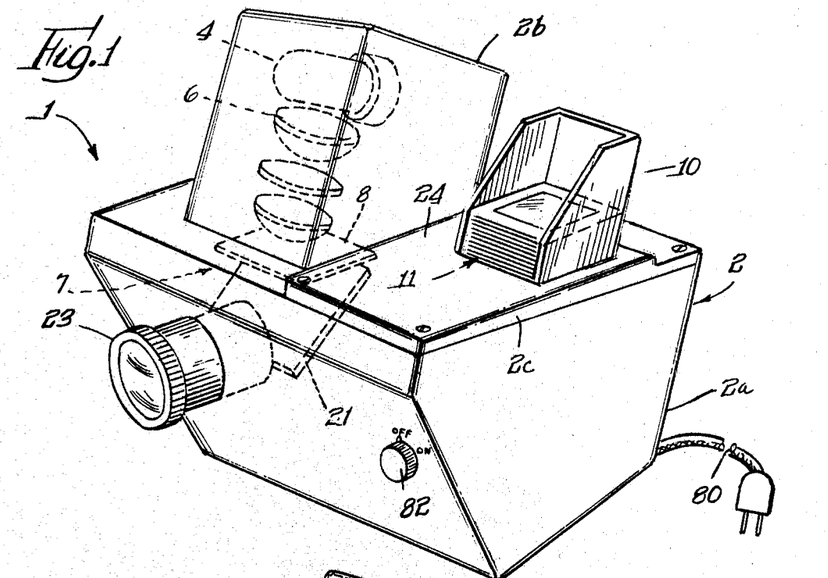
FIG. 1 is a perspective view of a photographic slide projector incorporating the features of the present invention.
Figure 2:
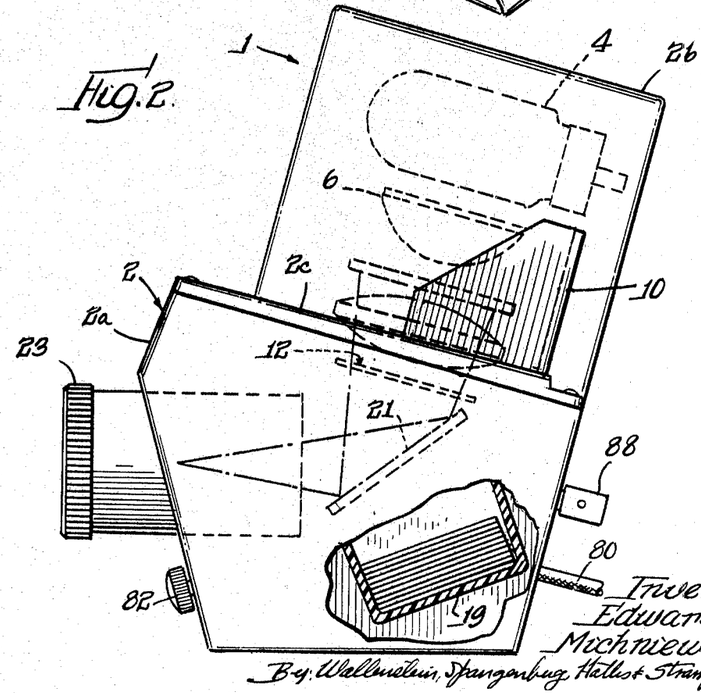
FIG. 2 is an end elevational view of the projector of FIG. 1, partly broken away.

Refer more particularly to FIGS. 1 and 2, which illustrate a photographic slide projector generally indicated by reference numeral 1. The projector illustrated in FIGS. 1 and 2 is designed for maximum compactness and minimum cost consistent with high quality projection and reliability in operation. As will appear, the projector is designed to operate reliably with slides of widely varying thickness or with slides which are warped.

The projector 1 has a housing 2 which may be made of a number of different sections of molded synthetic plastic material. The various sections of the housing shown in FIG. 1 includes a main housing body 2a which houses most of the components of the projector, an open bottom rectangular cover 2b which houses the projection lamp 4 and various lens elements 6 for projecting light through a slide 8 at a slide projection station 7 on the housing body 2a and a slide stack-receiving cover 2c which, in the illustrated form of the invention, includes as an integrally molded part thereof an open ended stack loader 10 in which a vertical stack 11 of slides 8 are placed. The particular manner in which the various sections of the projector housing 2 fit together forms no part of the present invention and the details of the housing 2 will not be described except where necessary to explain the features of the exemplary form of the invention.

In a manner to be described, the slides are fed one at a time in a forward direction from the bottom of the stack loader 10 upon a slide track 12 which extends in a lateral direction (a direction is transverse of the direction in which the slides are moved onto the track) between a slide-receiving station at one end of the track below the bottom of the stack 11 to the slide projection station 7 at the other end of the track. The track 12 has a slide support surface 12a which is generally in a horizontal plane, that is a plane which is more nearly horizontal than vertical. Just beyond the slide projection station 7 is a discharge station comprising an open top slide stacking chute 19 into which the slides drop after they are moved from the projection station 7.

The light from the lamp 4 shines through the lens elements 6 and the slide 8 at the projection station 7 and then is reflected off an inclined mirror 21 into a focusing lens unit 23 whose axis extends forwardly of the slide projector housing 2.

Figure 3:
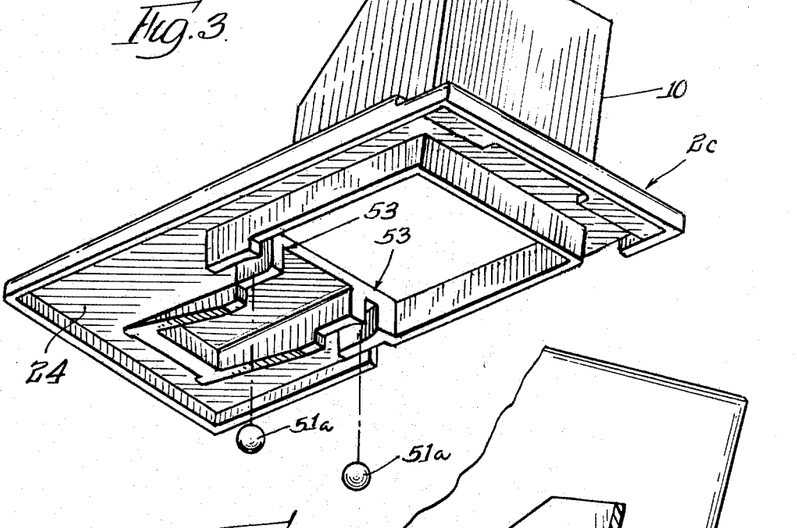
FIG. 3 is a bottom perspective view of a slide stack-receiving cover for the housing of the projector shown in FIGS. 1 and 2.
Figures 4, 6, 6A:
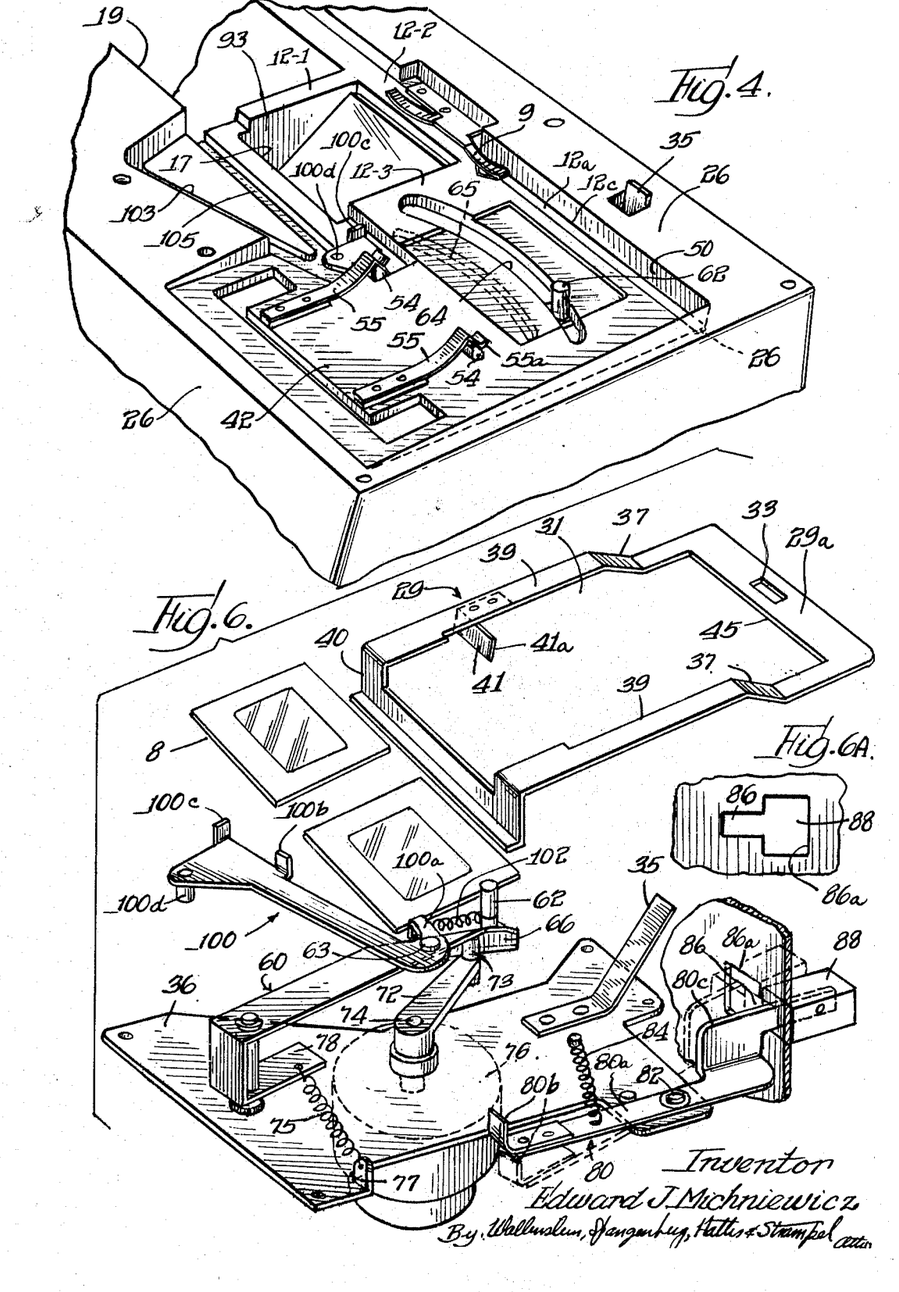
FIG. 4 is a perspective view of the upper portion of the housing body upon which the slide stack-receiving cover of FIG. 3 is mounted.
FIG. 6 is a perspective view of the slide feeding and transporting apparatus located below or within the slide stack-receiving cover.
FIG. 6A is a view of a slotted portion of the rear wall of the projector housing.
Figure 7:
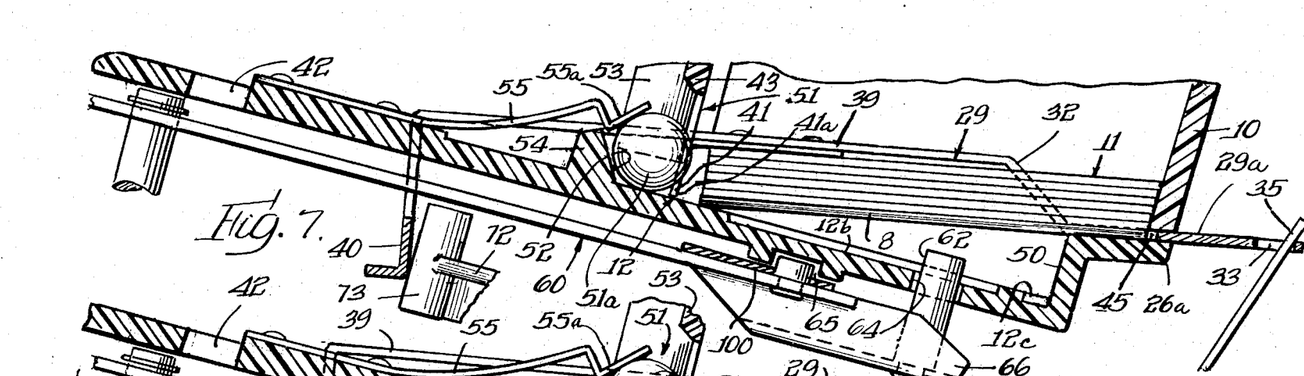
FIGS. 7, 8 and 9 are enlarged fragmentary vertical sectional views of that part of the projector shown in FIG. 5, illustrating the manner in which the slides are fed from the bottom of a stack of slides onto the slide track in preparation for support to the slide projection station.

The housing cover 2c has an upper wall 24 (FIGS. 3 and 5) which is in spaced relation to the top wall 26 of the housing body 2a to form a compartment 27 in which is reciprocally mounted a slide feeding member 29 is most advantageously a stamped sheet metal member slide feeding member preferably like that shown in FIG. 6. The slide feeding member there shown has a large opening 31 in the center thereof through which the stack 11 of the slide 8 extends. The illustrated slide feeding member has a generally horizontally extending rear end portion 29a which is slidably disposed upon a raised rear portion 26a of the top wall 26 of the housing body 2a which forms a ledge elevated above the rear end of the slide track 12. The rear portion 29a of the slide feeding member 29 has an opening 33 therein into which extends a leaf spring 35 (FIG. 5 and 6) anchored to a mounting plate 36 anchored in a suitable way to the walls of the housing body 2a. The leaf spring 35 urges the slide-feeding member 29 into an extreme rear position shown in FIGS. 5 and 7.

The rear end portion 29a of the slide feeding member 29 is connected by the inclined portions 37—37 to elevated forwardly extending side legs 39—39 which terminate in a depending flange 40 extending between the front ends of the legs 39—39. The flange 40 depends through an opening 42 (FIGS. 4 and 5) in the top wall 26 of the housing body 2a into a main compartment 44. The aforementioned mounting plate 36 forms a bottom partitioned wall for the compartment 44 in which most of the projector operating mechanism to be described is located.

Figure 5:
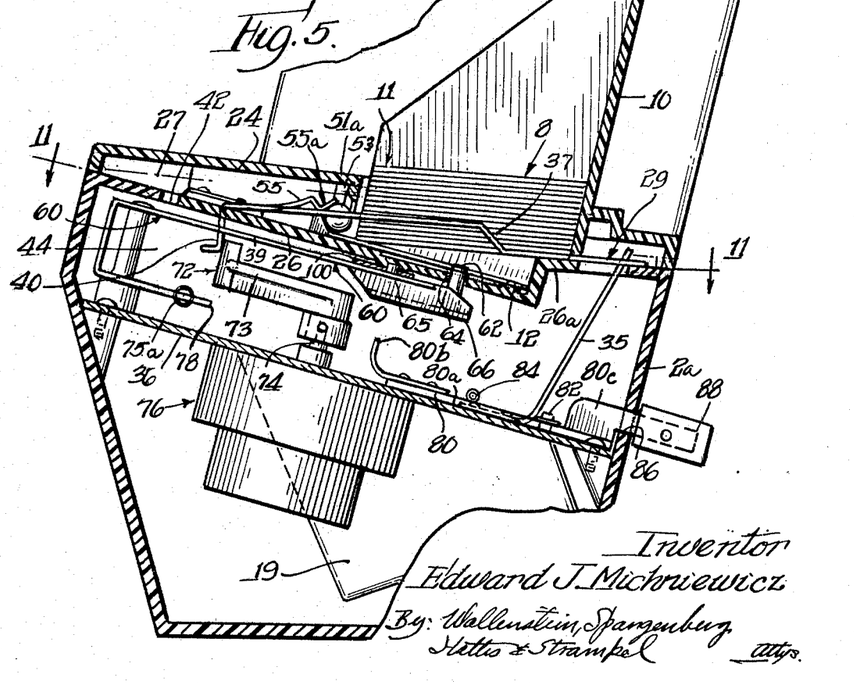
FIG. 5 is a fragmentary vertical sectional view of the portion of the projector housing including the slide stack-receiving cover of FIG. 3.

The rear end portion 29a of the slide feeding member 29 has a forwardly facing slide engaging edge 45 which moves in the plane of the bottommost slide in the stack loader 10 which has a thickness equal to or less than the thickness of the thinnest slide to be placed in the projector. The raised rear portion 26a of the projector housing body forms a ledge which supports the rear end portion of the vertical stack 11 of slides in the stack loader 10. The slide support surface 12a of the slide track preferably inclines slightly rearwardly and downwardly, and the rear end thereof is at an elevation below the front of the ledge 26a as best shown in FIG. 5. The slide support surface 12a may be interrupted by a number of indentations such as 12b and 12c best shown in FIGS. 7–9 into which the downwardly extending portions of a warped slide can extend.

The front end portion of the stack 11 of slides 8 rests upon the front portion of the slide support surface 12a. When the slide feeding member 29 is moved forwardly in a manner to be explained, the slide engaging edge 45 of the slide feeding member 29 will be moved to a position beyond the front end of the ledge 26a where the bottommost slide in the stack drops onto the slide support surface 12a. The slide feeding member 29 has depending from at least one of the side legs 39 thereof a slide engaging ear 41 (FIGS. 6–9) which has a rearwardly facing surface 41a which extends at right angles to the slide support surface 12a and parallel to a guide shoulder 50 at the rear of the slide track 12. In the absence of any forward pulling force on the slide feeding member 29, the rearwardly facing surface 41a of the slide engaging ear 41 will urge a slide pushed off the ledge 26a against the guide shoulder 50 and guide its movement toward the slide projection station 7 in a manner to be explained.

Figure 12:
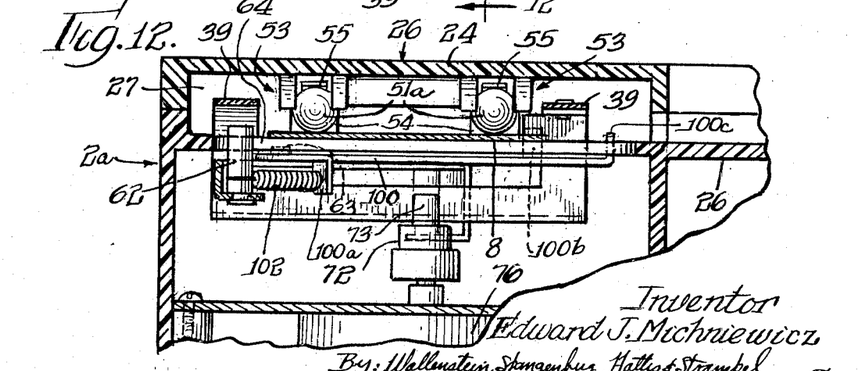
FIG. 12 is a vertical sectional view through FIG. 11, taken along section line 12—12 therein.

The slide above the bottommost slide in the stack 11 may possibly move for a distance with the bottom slide because of friction between the contacting faces of the slides, but the movement is limited so the slide cannot be pushed off the ledge 26a by slide abutment means generally indicated by reference numeral 51. The abutment means most desirably comprises a pair of spherical balls 51a—51a having a radius greater than the thickness of the thickest slides to be fed through the projector. The balls 51a—51a are mounted in spaced relation along the forward margin of the slide track 12 so as to engage the opposite forward end portion of the slide 8 as the rear end thereof is moved off the ledge 26a by the slide engaging edge 45 of the slide feeding member 29 upon the slide track 12. The front sides of the balls 51a—51a are confined by rear surfaces 52—52 formed on the rear sides of the bosses 54—54 preferably molded integrally with the top wall 26 of the projector housing body 2a. The rear surfaces 52—52 preferably incline upwardly and outwardly away from a plane transverse to the slide transport surface 12a. The balls 51a—51a are confined against rearward and lateral movement when the balls are in their bottommost position by ball enclosure housings 53—53 which are most advantageously molded integrally with the slide stack-receiving cover 2c as best shown in FIGS. 3 and 12. The balls 51a—51a are urged downwardly in the directions of the guide surface 52—52 by leaf springs 55—55 which are anchored on the top wall 26 of the housing body 2a. Each leaf spring 55 has a ball engaging end portion 55a which exerts the aforementioned downward force on the associated ball 51a which has a component transverse to the slide support surface 12a and parallel thereto.

Figures 19A, 19B:
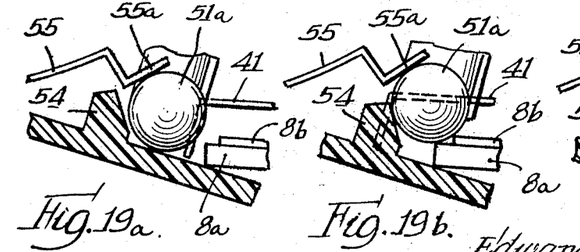
FIGS. 19a, 19b and 19c illustrate the operation of the slide abutment balls for a thick slide.
Figure 19C:
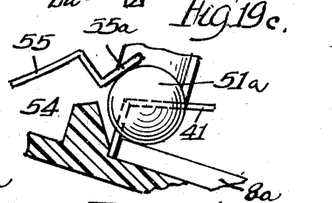

When the slide engaging edge 45 of the slide feeding member 29 is moved forwardly, the force of the slide feeding member will be applied directly only to the bottommost slide, so that this slide is readily pushed beneath the resiliently downwardly urged balls 51a—51a. Any slide above the bottom slide in the stack which tends to move with the bottom slide as the latter is pushed by the slide feeding member 29 will abut against the bottom half of the balls 51a—51a before it clears the ledge 26a and will be held against movement beneath the balls because of the opposition thereto by the spring urged balls. The springs 55—55 acting on the balls 51a—51a react upon a slide above the bottommost slide pushed thereagainst by kicking the same rearwardly back into a position where it is in alignment with the rest of the slides in the stack 11. Thus, as a slide 8a (FIG. 19a) is positioned on the track 12, the slide first pushes the balls forwardly (FIG. 19b) and raise the same. When the slide is almost completely beneath the stack, the springs will force the balls rearwardly over the slide 8a (FIG. 19c) and, in so doing, will kick the next slide 8b fully back into the stack if the latter slide 8b had moved with the bottommost slide 8a. For very thick slides like 8a, the balls must engage the rear boss surfaces 52—52 before the springs can push the balls over the slide involved.

A slide transport member comprising an elongated arm 60 (FIGS. 5–6) is pivotally mounted within the projector housing compartment 44 upon the mounting plate 36. The slide transport arm 60 has a slide engaging pin 62 which projects upwardly through an arcuate slot 64 in the top wall 26 of the housing 2a which slot falls along a circle concentric with the pivot axis of the arm 60. The slide transport arm 60 preferably moves in a plane parallel and contiguous to the top wall 26 of the housing body 2a, and has, in addition to the slide engaging pin 62, a short upwardly extending pin 63 which moves within an undercut slot 65 formed in the bottom surface of the housing body top wall 26. The slide transport arm 60 additionally has adjacent its free end a downwardly extending flange 66 which is adapted to be engaged by an upwardly extending drive pin 73 on the end of a crank arm 72 attached to a drive shaft 74 projecting from a motor housing 76 carried on the mounting plate 36.

The slide transport arm 60 is normally urged in a clockwise direction to an extreme inoperative position by a suitable spring 75 mounted between a lug 77 on the mounting plate 36 and an extension 78 on the base of the slide transport arm 60. In this extreme position of the slide transport arm 60, the pin 62 thereof is at one end of the slide-receiving station where it is in position to engage the edge of a slide moved off of the ledge 26a onto the track 12. The drive pin 73 on the crank arm 72 during a part of its revolution will engage the depending flange 66 of the slide transport arm 60 and move the same in a counterclockwise direction to carry the pin 62 to a position opposite the slide transport station. In the course of the movement of the slide transport arm, the pin 62 passes beneath the slides 8 in the stack 11 and engages the edge of any slide pushed off the ledge onto the slide track 12. The drive pin 73 loses contact with the depending flange 66 of the slide transport arm when the pin is opposite the slide projection station 7 and the spring 75 then returns quickly the slide transport arm to its initial extreme inoperative position.

The motor housing 76 contains a suitable electrical motor which is energized by current delivered through a power cord 80 (FIG. 1) and an on-off switch controlled by a knob 82 (FIG. 1) on the outside of the projector housing. The motor housing 76 includes a suitable slip clutch of any well known construction connected between the shaft of the motor (not shown) and the drive shaft 74, so that the crank arm 72 may be held stationary while the motor shaft continues to rotate. The motor housing 76 also contains a suitable gear train for slowing down the speed of rotation of the crank arm 72 so that to complete a revolution so a slide will be in view for it takes a number of seconds for the crank arm 72 a number of seconds before a slide changing operation.

When it is desired to disable an automatic slide feeding operation so the viewer may view a slide as long as he desires, a stop member 80 (FIGS. 6, 6A, 19 and 20) is moved into the path of travel of the crank arm 72 to stop the same. The stop member 80 illustrated in the drawings comprises an arm 80a pivotally mounted at 82 intermediate its ends upon the mounting plate 36. A spring 84 (FIG. 6) extending between the mounting plate 36 and a point on the arm 80a normally pivots the arm 80a to a position where an upturned end 80b of the arm is in the path of movement of the crank arm 72. The arm 80a has a rearwardly extending handle-forming portion 80c projecting through a horizontally elongated slot 86 in the rear wall of the housing body 2a. A handle member 88 is mounted on the end of the handle-forming portion of the arm 80a so that it slides longitudinally with respect thereto. The arm 80 is normally held in a position where the upturned end of the arm 80a is out of the path of movement of the crank arm 72 by moving the handle member 88 in a direction which pivots the arm 80a in a clockwise direction against the force of the spring 84, so that the handle member 88 is brought opposite an enlarged end portion 86a of the slot 86 where the handle member 88 can be pushed forwardly into the same, where the pull of the spring 84 on the arm 80a holds the handle member snugly within the enlarged end 86a of the slot 86. The handle member 88 can be readily released from this position by sliding the sliding handle member 88 longitudinally outwardly out of the enlarged end 86a of the slot 86.

Figures 8, 9:
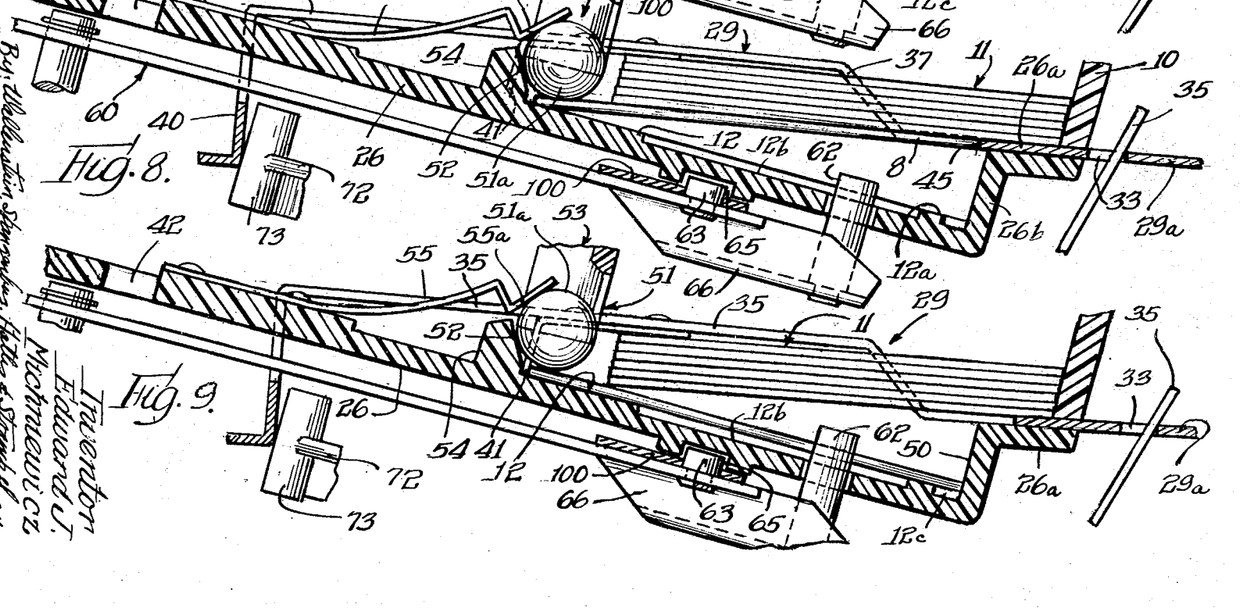

One of the advantageous features of the invention is in the simplicity of the mechanism which imparts movement to the slide transport arm 60 and the slide feeding member 29. The mechanism for reciprocating the slide transport arm 60 has already been described. The same crank arm 72 used to impart movement to the slide transport arm 60 is also used to reciprocate the slide feeding member 29. Thus, the crank arm 72 also has a depending portion 73 which, during a part of the revolution of the crank arm, engages the depending flange 40 at the front end of the slide feeding member 29 and pulls the same forwardly against the force of the leaf spring 35. When the crank arm 72 has moved the slide feeding member 29 to its forwardmost position as shown in FIG. 8, the slide engaging ear 41 is clear of the forwardly facing edge of the slide pushed off the ledge 26a. As the crank arm 72 continues to rotate from the position which pushed the slide feeding member to its extreme position, the slide feeding member 29 will follow the crank arm until the slide feeding member 29 is held by the forward facing edge of the slide 8 on slide track 12 as shown in FIG. 9. The slide engaging ear 41 creates a pressure against the slide which urges the same against the guide shoulder 50 at the rear of the track 12.

Means are provided at the slide projection station for positioning the slide thereat and for flattening out warped slides. This means includes a double winged leaf spring 90 (FIGS. 15–16) which is anchored to the inclined face of a plate member 91 anchored by screws 92 to the top wall 26 of the housing body 2a. The track 12 at the slide projection station has an opening 93 thereon. The opening 93 in the slide track 12 at the slide projection station overlies the mirror 21 which inclined forwardly and downwardly, as best shown in FIG. 1. As best shown in FIG. 4, a slide moved to the projection station is supported along three sides thereof by slide track portions 12–1, 12–2 and 12–3 at the margins of the opening 93. The surface 94 of the plate member 91 (FIG. 15) supports the slide at the fourth side of the opening 93. The leaf spring 90 is positioned above the plate member surface 94 at the front margin of the slide 8 at the slide projection station and has wings 90a—90a which face downwardly and rearwardly at an angle with respect to the slide support surface so that the wings 90a—90a will engage the front upper corner 8a (FIG. 15) of the slide track and the guide shoulder 50. The leaf spring 90 cooperates with a double-winged leaf spring 95 secured to the housing body 2a above the rear end of the slide track 12 to flatten the rear end portion of the slide 8 against the slide support surface portion 12–2.

As previously indicated, a slide at the slide projection station is normally moved to the stacking chute 19 beyond the slide projection station upon the movement of a new slide into position at the projection station. The latter slide makes edge-to-edge contact with the slide at the projection station so that, during a slide changing operation, the observer will not see distracting light streaks between slides as would be the case if there was a gap between adjacent slides moved into projection position. However, this method of moving slides into and out of projection position creates a problem with respect to the last slide delivered to the slide projection station since, as above indicated, there is no subsequent slide to push the last slide into the slide stacking chute 19. Thus, another feature of the invention is the provision of a last slide pushing member generally indicated by reference numeral 100 shown in FIGS. 6, 10, 11, 14, 17 and 18.

Figure 10:
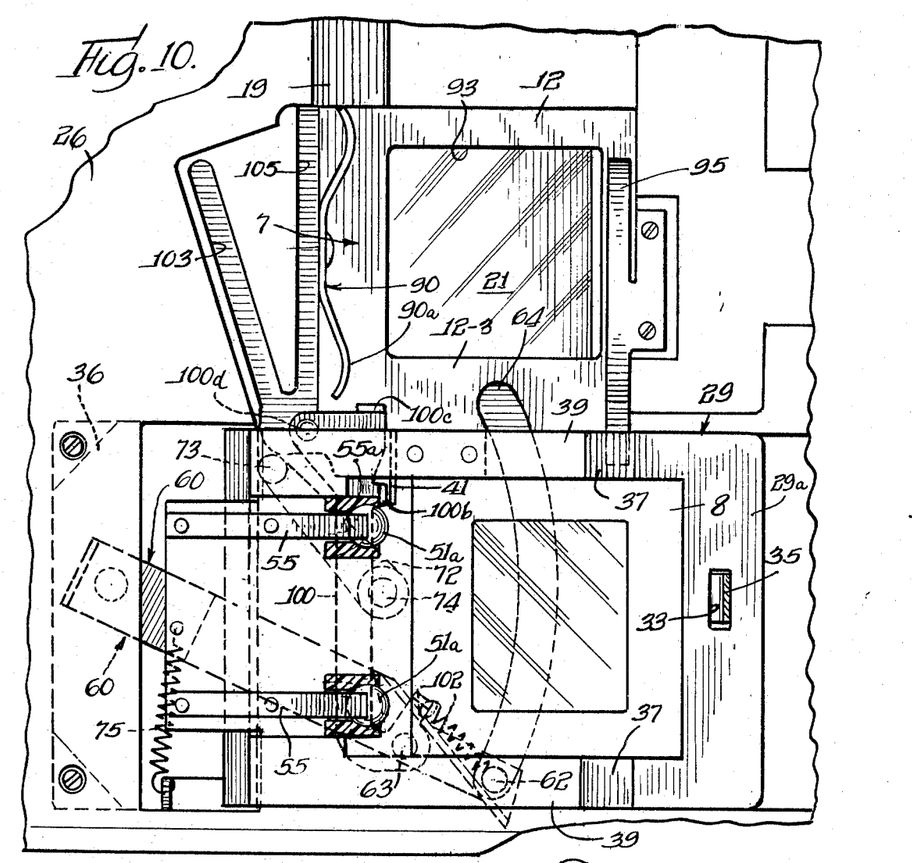
FIGS. 10 and 11 are horizontal sectional views of the projector taken along section line A—A in FIG. 5 showing the movement of a slide from the bottom of a stack of slides onto the slide-receiving station.
Figure 11:
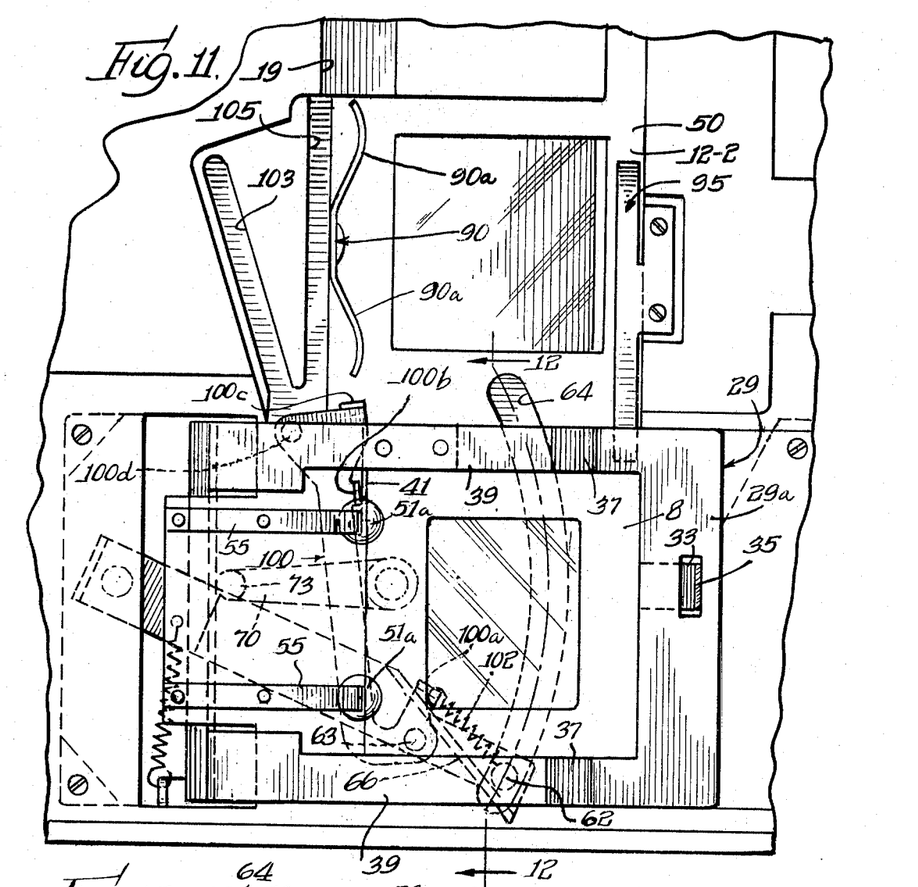
Figures 13, 14:
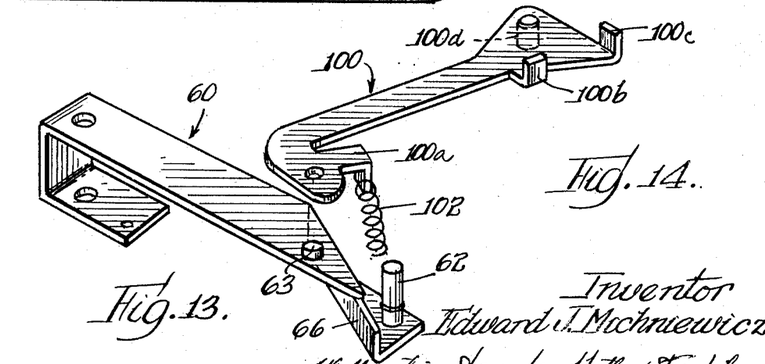
FIG. 13 is a perspective view of the slide transport arm forming part of the slide feeding apparatus of the projector.
FIG. 14 is a perspective view of the last slide pusher member forming part of the slide feeding apparatus of the projector.
Figures 15, 16, 19, 20:
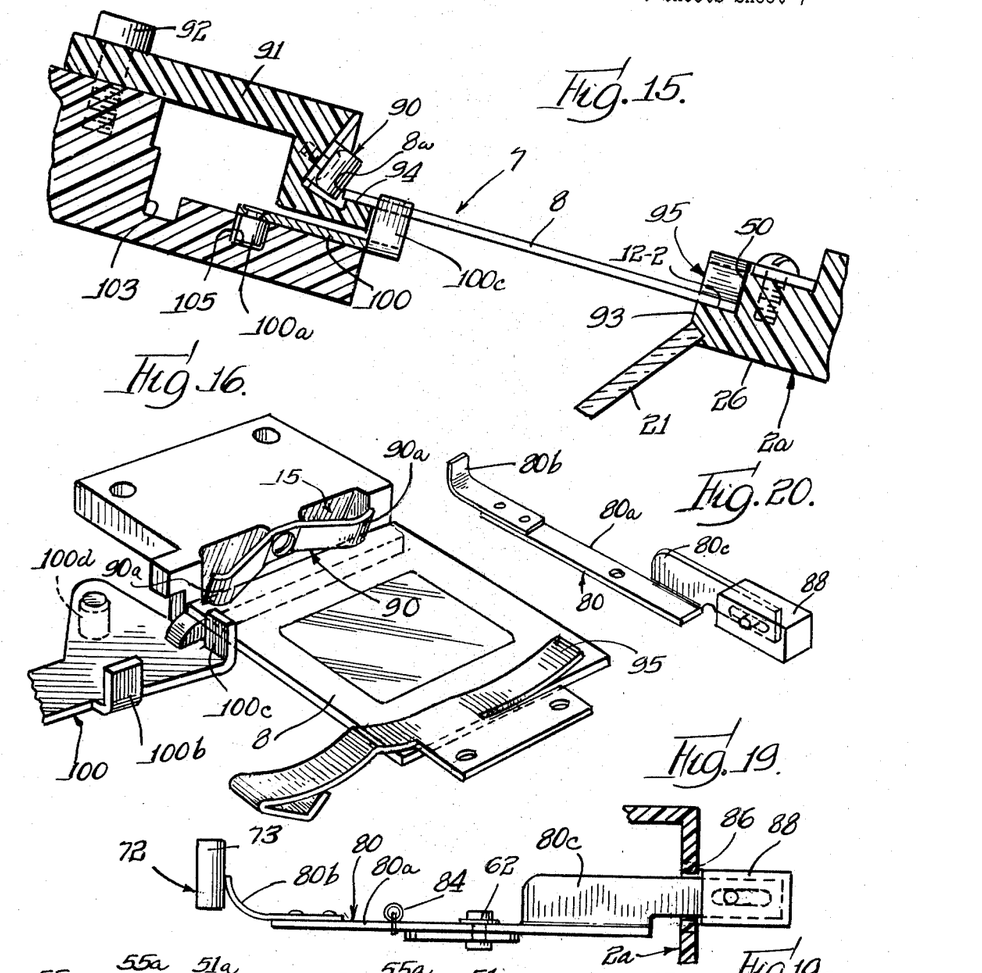
FIG. 15 is an enlarged vertical sectional view through the slide projection station of the projector, illustrating the manner in which a slide is precisely positioned at the slide projection station.
FIG. 16 is a perspective view of the slide projection station shown in FIG. 15.
FIG. 19 is an enlarged fragmentary vertical sectional view through the slotted rear wall of the projector illustrating manner in which an automatic slide feeding operation is rendered inoperative.
FIG. 20 is a perspective view of a slide feeding inhibiting member forming part of the apparatus shown in FIG. 5.
Figure 17:
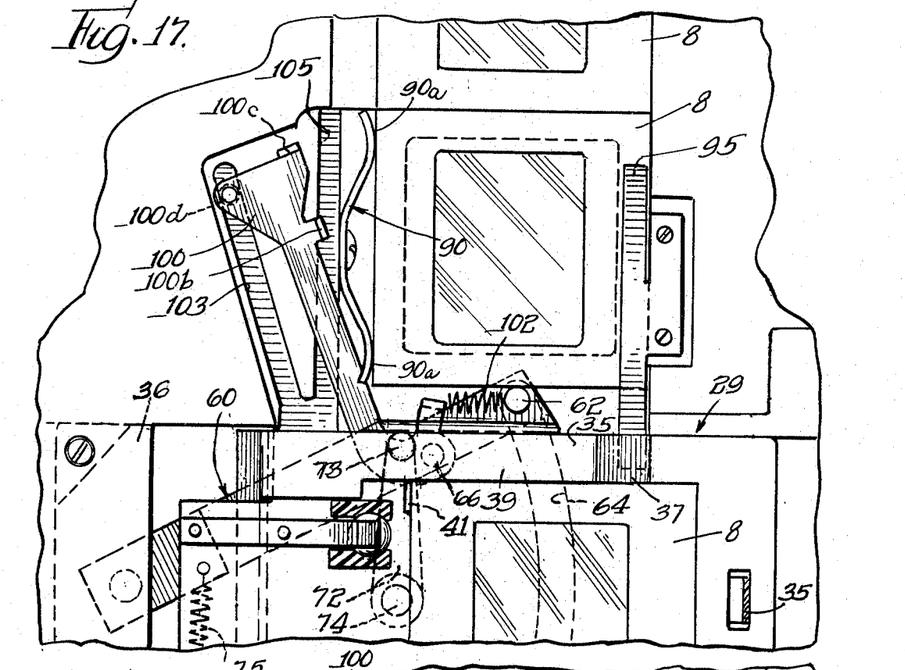
FIG. 17 is a horizontal sectional view through the projector showing a slide being moved to the projection station while the slide previously in the projection station is pushed into the stacking chute at the discharge station of the projector.
Figure 18:
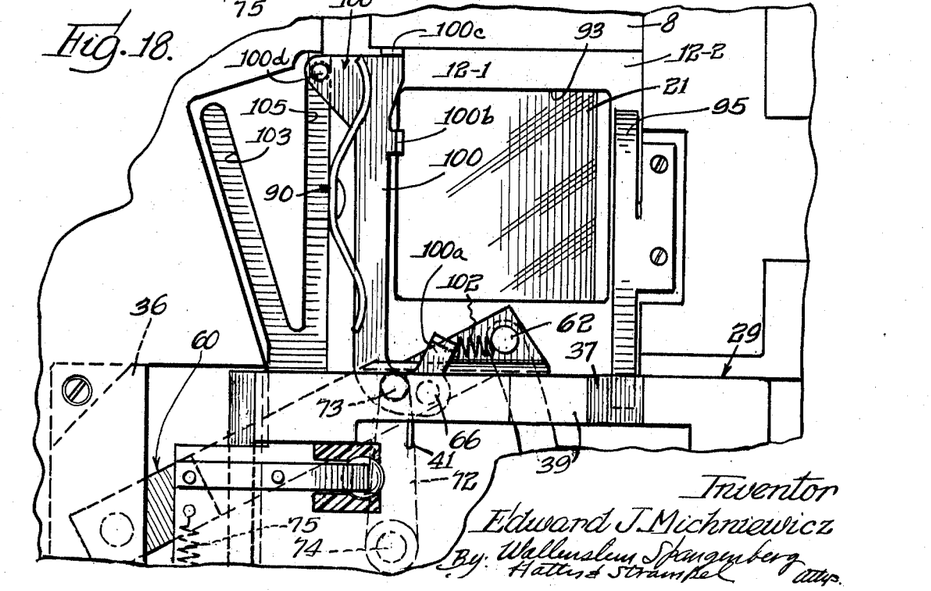
FIG. 18 is a view corresponding to FIG. 17 showing the manner in which the last slide is moved from the slide projection station to the stacking chute at the discharge station by the last slide pushing member of FIG. 14.

As best shown in FIGS. 5, 6 and 14, the last slide pusher member 100 is most advantageously an elongated arm which is pivotally mounted on the short pin 63 projecting upwardly from the top of the slide transport arm 60. The last slide pusher arm 100 has a short extension 100a at the end thereof which is engaged by a spring 102 anchored at the other end to the slide engaging pin 62 of the slide transport arm 60. The spring 102 urges the last slide pusher arm 100 in a clockwise direction. When the slide transport arm is in the initial inoperative position, the last slide pusher arm 100 extends forwardly to a point spaced a short distance from the slide projection station 7 (FIG. 4). The last slide pusher arm 100 has a slide engaging extension 100c which can move in a path which will engage the end of a slide at the slide projection station when the arm is in the position as shown in FIGS. 10 and 18, and in a path which misses the slide at the slide projection station when the arm is pivoted counterclockwise to the position shown in FIGS. 11 and 17.

When the slide transport arm 60 is in its initial inoperative position, the spring 102 holds the last slide pusher arm 100 in a position where an upwardly extending lug 100b on the side thereof engages the depending ear 41 on the slide feeding member 29. When a slide is delivered to the slide receiving station at the end of the slide track 12 by the forward movement of the slide feeding member 29, the ear 41 thereof engages the lug 100b of the arm 100 and pivots the arm 100 counterclockwise into a position where the front extension 100c thereof will miss the slide at the slide projection station when the arm 100 is moved with the slide transport arm 60. As previously indicated, the slide feeding member 29 remains in its forward position until the slide involved has been delivered to the slide projection station. Thus, when a slide is pushed by the slide transport member 60 to the slide projection station, the slide at the projection station will not be moved into the stacking chute 19 by the last slide pusher arm 100 but will be so moved by the slide being fed to the slide projection station. However, when a slide is not delivered to the slide receiving station of the slide track 12, the slide feeding member 29 will not remain in a forward position when the crank arm 72 pulls the same into its forward position, but will return to its initial rear extreme position so as the slide transport arm 60 is subsequently advanced toward the slide projection station the last slide pusher arm 100 will have returned to its extreme clockwise position where the slide engaging extension 100c will engage the slide at the slide projection station and push the same into the stacking chute 19, as illustrated in FIG. 18.

When the slide transport member 60 moves toward the slide projection station, a point is reached where the upwardly extending lug 100b on the last slide pusher arm 100 will slide off of the depending ear 41 of the slide feeding member 29. In such case, the spring 102 would in the absence of the feature of the invention to be described, pull the end of the arm 100 against the edge of a slide being moved toward the slide projection station. If the slide is made of cardboard, as in the case of most slides processed in the United States, the resultant pressure of the arm 100 on the slide could readily damage the slide. To prevent the last slide pusher arm 100 from being pulled against the edge of a slide being moved to the projection station or at the projection station, a guide track 103 is formed in the top wall 26 of the housing body 2a into which a depending pin 100d on the arm 100 passes as the lug 100b slides off of the ear 41. The pin 100d then follows the track 103 which holds the last slide pusher arm 100 in its extreme counterclockwise position where it will not engage the edge of a slide being moved toward the slide projection station.

The upper wall 26 of the housing body 2a has a second track 105 into which the depending pin 100d extends when the last slide pusher arm 100 is urged by the spring 102 in its clockwise direction in the absence of a slide at the slide receiving station of the slide track 12.

It should be appreciated that the present invention has provided an extremely simply constructed, inexpensive and reliable means for feeding slides one at a time from a stack of slides into a track and then to slide projection and discharge stations.

It should be understood that numerous modifications may be made in the preferred form of the invention described above without deviating from the broader aspects thereof.

I claim:

1. In combination with slide support means for supporting a stack of slides which may be of varying thicknesses and arranged in parallel face-to-face relation, a slide retaining ledge positioned to extend transversely of the stack of slides at the rear of the first slide in the stack for holding the same against movement in a direction parallel to the stack, slide feeding means mounted for reciprocating movement and having a slide engaging portion which moves along and slightly beyond said ledge in the plane of the first slide remaining in the stack for engaging the rear edge of only the first slide in the stack and moving the same forwardly to a point where it clears the end of the ledge, and a slide-receiving track having a slide-receiving end for receiving the first slide in said stack after it is pushed beyond said ledge the improvement comprising means for holding the next slide in the stack against movement with said first slide to a degree where the next slide clears said ledge, and means comprising freely rotatable spherical ball means in confronting relation to said track at said slide-receiving end thereof to receive between the ball means and the track the front end portion of the first slide moved beyond the ledge, the radius of said spherical ball means being greater than the thickest slide to be accommodated in said stack, and resilient means for urging said spherical ball means against said track, the spherical ball means being raised from the track by the first slide in the stack and the resilient urged spherical ball means preventing the next slide in the stack from moving between the spherical ball means and said track.

2. The combination of claim 1 wherein said spherical ball means are supported for movement in a direction inclining forwardly and upwardly away from a plane normal to said track.

3. The combination of claim 2 wherein said resilient means acts on said spherical ball means downwardly and rearwardly where the ball means is initially moved forwardly by the bottommost slide in the stack as it is pushed forwardly by the slide feeding means and is forced rearwardly by the resilient force acting thereon when the slide reaches a position beneath the ball means, thereby to kick a slide moving with the bottommost slide rearwardly back into alignment with the other slide in the stack.

4. Slide support and removal apparatus comprising: a generally vertical stack of slides with the planes of the slides extending generally horizontally, said stack of slides containing slides varying in thickness between a given minimum thickness to a given maximum thickness, means including a generally horizontally extending ledge for supporting the rear end portion of said stack of slides, a rearwardly and downwardly inclining slide support surface in front of said ledge, the rear end of said surface being below the forward end of said ledge, the forward portion of said slide support surface supporting the front end portion of said stack of slides, a generally horizontally extending slide feeding member having a slide engaging portion with a thickness no greater than said given minimum slide thickness, said slide feeding member being mounted for reciprocating movement along said ledge so said slide engaging portion therof moves in the plane of the bottommost slide in said stack and engages the rear edge of the bottommost slide and pushes the same off of said ledge where it will be deposited on said slide support surface, slide abutment means confronting the slide support surface and beneath which the bottommost slide of said stack passes when said slide feeding member pushes the bottommost slide off of said ledge, said slide abutment means including resilient means for resiliently urging the same toward said slide support surface so the abutment means moves away from said slide support surface when the bottommost slide in said stack is pushed beneath the same, said slide abutment means acting as an abutment shoulder for the slide above said bottommost slide to prevent the same from moving with the bottommost slide beneath the slide abutment means and beyond the edge of said ledge.

5. The apparatus of claim 4 when said slide abutment means are spherical ball means which are urged by said resilient means downwardly against side slide support surface.

6. The apparatus of claim 5 wherein said spherical ball means have a radius greater than said given maximum slide thickness.

7. The combination of claim 5 wherein the spherical ball means are guided for movement in a direction inclined forwardly and upwardly with respect to a plane normal to said slide support surface and said resilient means acts downwardly and rearwardly.

8. Slide feeding apparatus for feeding one slide at a time from an end of a stack of slides arranged in parallel, face-to-face relation and urged toward one end of said stack, said apparatus comprising a slide retainer ledge for retaining the rear end portion of the first slide in the stack against movement longitudinally of the stack, a slide-receiving surface positioned forwardly of said ledge in a plane offset therefrom in a direction away from the space adjacent said ledge to be occupied by the stack of slides, a reciprocally mounted slide feeding member having a forwardly facing slide-engaging portion for engaging the rear edge of the first slide in said stack when in an extreme rearward position and, upon movement therefrom to an extreme forward position, moving the rear end portion of the first slide in the stack off of said ledge onto said slide-receiving surface, slide transport means for intermittently engaging an end edge of a slide resting on said slide-receiving surface adjacent to said ledge and moving the same along said surface toward a projection station, and means for moving said slide feeding member between said extreme rearward and forward position following the movement of a slide by said slide transport means toward said projection station, the last mentioned means including means for resiliently urging said slide feeding member to said extreme rearward position, and motion imparting means for intermittently forcing said slide feeding member forwardly into said forward extreme position, the force applied by said motion imparting means terminating when said slide feeding member reaches said extreme forward position, whereupon said resilient means then operates to urge said slide feeding member toward said rearward extreme position.

9. The slide feeding apparatus of claim 8 wherein there is provided at the rear end portion of said slide-receiving surface a forwardly facing slide guiding shoulder extending transversely of said surface in the direction of said ledge and along which shoulder the slide is to be guided to said projection station, and said slide feeding member including a slide engaging surface for engaging the front edge of a slide moved off of said ledge onto said slide-receiving surface and urging the same against said slide guiding shoulder so that the slide will be guided toward said projection station in a definite predetermined path.

10. The slide feeding apparatus of claim 9 wherein said slide engaging surface on said slide feeding member is an elongated surface which extends parallel to said slide guiding shoulder thereby to form a guide shoulder also guiding said slides for movement in said predetermined path.

11. The slide feeding apparatus of claim 8 wherein said means for intermittently forcing said slide feeding member into said forwardmost position includes motor means, a member rotated by said motor means in a continuous circular path and means driven by said rotating member for engaging said slide feeding member for a part of each revolution of said member and moving the same forward to said extreme forward position.

12. The slide feeding apparatus of claim 11 wherein said slide transport means comprises an arm pivotally mounted for movement in a plane extending generally parallel to said slide-receiving surface, said pivoted arm has means for engaging an edge of a slide moved off of said ledge onto said slide-receiving surface and moving the same toward said projection station when pivoted from an initial position, resilient means normally urging said pivoted arm into said initial extreme position, said rotating member driven by said motor means has a portion which engages a part of said pivoted arm during a part of each revolution thereof for moving said pivoted arm from said initial position to a second position where a slide is moved toward said projection station, and said rotating member losing contact with said pivoted arm after the arm reaches said second position, whereupon said resilient means returns the pivoted arm to said initial position.

13. In a slide feeding apparatus including a slide track extending from a slide-receiving station to a slide projection station, the improvement in means for feeding a slide from said slide-receiving station to said slide projection station on said track, said means comprising motor means, a rotating member driven in a continuous circular path by said motor means, a slide transporting arm reciprocally mounted for movement in a first direction generally parallel to said track and between opposite extreme positions, said arm having means for engaging the edge of a slide delivered to said track at said slide-receiving station and moving the same to said projection station as the arm is moved from one to the other of said extreme positions, and resilient means normally urging said arm into said one extreme position, said rotating member having a portion which engages said slide transporting arm during only a part of each revolution thereof for moving the same from said one to said other extreme position, said rotating member losing contact with said slide transporting arm after the arm reaches said other extreme position, said resilient means then returning the arm to said one extreme position.

14. The slide feeding apparatus of claim 13 wherein there is provided a slide holding means positioned laterally of said slide-receiving station for holding a stack of slides, slide feeding means mounted for reciprocating movement in a second direction generally transverse to said first direction and in a plane parallel to the plane of the first slide in said stack for feeding the first slide in said stack to said slide-receiving station as it is moved from a first to a second position, and means responsive to the movement of said rotating member for engaging said slide feeding means and moving the same at least from said first to said second position.

15. The slide feeding means of claim 14 wherein said responsive means engages said slide feeding means for only a part of the revolution of said rotating member and there is provided resilient means for urging said slide feeding means to said first position when said responsive means loses contact with said slide feeding means.

16. The slide feeding apparatus of claim 13 wherein said rotating member is connected to said motor means through a slip clutch which permits the motor to continue in operation when the rotating member is held against rotation, and manually operable means releasable lockable in a position in the path of movement of said rotating member after the same has moved a slide from said slide-receiving station to said projecting station for preventing a subsequent slide transfer operation until release of said manually operable means.

17. In a slide feeding apparatus including a slide track extending from a slide-receiving station to a slide projecting station and then to a slide discharge station just beyond the slide projection station, and means for sequentially feeding the slides from said slide-receiving station to said slide projection station comprising a slide transport member having a slide engaging portion movable from a first position opposite the slide-receiving station where it just engages the end of a slide delivered to said slide-receiving station and a second position where it moves the slides to the projecting station, the slide so moved pushing the slide previously located at the slide projection station to said discharge station, the improvement in means for moving the last slide at the projection station to the discharge station comprising: a last slide pusher member having a slide engaging means movable with said slide transport member along two paths, one of which includes the space to be occupied by the slide at said slide projection station wherein said slide engaging means will engage the slide thereat and push the same to said discharge station, and the other of which bypasses said space to be occupied by the slide at the projection station, and means responsive to the presence of a slide in advance of the slide at said projection station for causing said slide engaging means to move along the latter path which bypasses the space to be occupied by the slide at said slide projection station, and responsive to the absence of a slide in advance of the slide at said projection for causing said slide engaging means to move along the former path which includes said space to move the last slide to said discharge station.

18. The slide viewing apparatus of claim 17 wherein the last slide pusher member is a member pivotally mounted upon said slide transport member, means resiliently urging the last slide pusher member to a first position where the slide engaging means thereof will move in said one path as said slide transport member is advanced to said slide projection station, the last slide pusher member being pivoted into a second position against the force of said resilient means by the presence of a slide immediately in advance of said slide projection station in which second position the slide engaging means will move in said other path as said slide transport member is advanced to said slide projection station.

19. The slide viewing apparatus of claim 17 wherein there is provided first and second tracks respectively for guiding the slide engaging means for movement in said separate paths, the last slide pusher member including means for moving in one track or the other depending upon the presence or absence of a slide in advance of said slide projection station.

20. In a slide viewing apparatus having a slide-receiving station where slides are intermittently received and oriented in a plane which is more nearly horizontal than vertical, there being a slide track extending from the slide-receiving station to a slide projection station having a slide support for the bottom of a slide delivered thereto and a positioning shoulder extending upwardly from one margin of said slide support against which shoulder one edge of a slide fed to said slide projection station is to be positioned, and slide transport means for engaging an edge of a slide delivered to said slide-receiving station and moving the same to the slide projection station, the improvement comprising: slide positioning means at said slide projection station to orient the slides thereat, said slide positioning means comprising resilient means at one side of said slide support adjacent to said abutment shoulder and immediately above the slide support at the slide projection station for urging the adjacent marginal portion of the slide downwardly against said slide support to flatten the same, and resilient means at the opposite side of the slide support which resilient means has an inclined slide corner engaging surface for engaging the upper corner of the slide delivered to the slide projection station and urging the same against both said slide support and positioning shoulder.

References Cited

UNITED STATES PATENTS

| | | | |
|---|---|---|---|
| 2,583,442 | 1/1952 | Parlini et al. | 353—104 |
| 3,125,820 | 3/1964 | Maiershofer | 353—103 |
| 3,146,667 | 9/1964 | Mulch | 40—79 XR |
| 3,273,454 | 9/1966 | Bast | 353—104 |
| 3,284,937 | 11/1966 | Weggeland | 40—78 |
| 3,394,476 | 7/1968 | Zillmer | 40—79 |
| 3,412,495 | 11/1968 | Zillmer | 40—79 |

FOREIGN PATENTS

| | | |
|---|---|---|
| 236,219 | 5/1960 | Australia. |
| 340,931 | 3/1904 | France. |

NORTON ANSHER, Primary Examiner

R. P. GREINER, Assistant Examiner

U.S. Cl. X.R.

40—79; 353—112